United States Patent [19]

Bengtsson

[11] Patent Number: 5,498,149
[45] Date of Patent: Mar. 12, 1996

[54] DEVICE FOR THERMOFORMING A POURING SPOUT

[75] Inventor: Jörgen Bengtsson, Lund, Sweden

[73] Assignee: Tetra Laval Holdings & Finance S.A., Pully, Switzerland

[21] Appl. No.: 274,721

[22] Filed: Jul. 18, 1994

[30] Foreign Application Priority Data

Aug. 31, 1993 [SE] Sweden .................. 9302810

[51] Int. Cl.⁶ .................................. B29C 43/18
[52] U.S. Cl. .............. 425/387.1; 425/394; 425/397; 425/DIG. 58; 249/59
[58] Field of Search .............. 425/387.1, 394, 425/397, DIG. 58, 577, 395, 399; 249/59

[56] References Cited

U.S. PATENT DOCUMENTS

| | | | |
|---|---|---|---|
| 2,531,539 | 11/1950 | Smith | 425/378.1 |
| 3,280,425 | 10/1966 | Voumard | 425/399 |
| 3,930,770 | 1/1976 | Gaudet et al. | 249/59 |
| 4,382,767 | 5/1983 | Maugle et al. | 425/387.1 |
| 4,383,815 | 5/1983 | Kiefer et al. | 425/387.1 |
| 4,518,554 | 5/1985 | Hatakeyama et al. | 249/59 |
| 4,867,929 | 9/1989 | Albrecht et al. | 425/387.1 |
| 4,952,130 | 8/1990 | Reil | 425/577 |
| 5,206,037 | 4/1993 | Robbins, III | 425/397 |

FOREIGN PATENT DOCUMENTS

| | | |
|---|---|---|
| 2630022 | 1/1977 | Germany . |
| 9100921 | 9/1992 | Sweden . |

Primary Examiner—Khanh P. Nguyen
Attorney, Agent, or Firm—Burns, Doane, Swecker & Mathis

[57] ABSTRACT

The invention relates to a device for thermoforming a pouring spout from a sheet of thermoplastic material. The device includes a forming tool for engaging a first side of the thermoplastic sheet and a tube for advancing an outer closure portion or a screw cap to a second side of the thermoplastic sheet. A spacer ring of resiliently yieldable material is positioned on the advancement tube. A neck of the pouring spout is created between and upper side of the package and the outer closure portion or screw cap.

12 Claims, 1 Drawing Sheet

5,498,149

DEVICE FOR THERMOFORMING A POURING SPOUT

BACKGROUND OF THE INVENTION

The present invention relates to a device for thermoforming, from a thermoplastic material sheet, a pouring spout which is intended to be surrounded by an outer closure portion. The device includes a forming tool wherein the closure portion is included, and a tube for advancing the closure portion.

Previously known methods entail forming, from a sheet of thermoplastic material, a pouring spout which is surrounded by an outer closure portion, or so-called screw cap.

The thermoplastic material sheet may comprise the entire upper side of a package which otherwise consists of a packaging laminate with a core of paper or paperboard to which are laminated different layers, of which the outermost is thermoplastic. The package may be of round or square cross section. The thermoplastic material sheet may also consist of a minor portion, covering a cut-out section from a conventional laminate package, so that it is fixedly welded in place against the inside of the laminate package consisting of thermoplastic material. Such a package may, for example, be a so-called gable top package.

On one of the above package types which is finished inasmuch as it consists of side walls and an upper panel or wall, a pouring spout is formed in the upper panel. A forming tool is passed through the as yet uncompleted bottom of the package, and from the upper side of the package, an outer closure portion is lowered, this closure portion being a so-called screw cap which serves as a mould for forming the pouring spout. When the pouring spout has been formed in this manner, the upper portion of the pouring spout is fixedly sealed against the inside of the outer closure portion and, in such instance, the outer closure portion—the screw cap—may readily fasten to the plasticized thermoplastic sheet, so that opening of the package is impeded.

OBJECTS AND SUMMARY

One object of the present invention is to make possible sealing of a pouring spout to an outer closure portion without the outer closure position fastening to the plasticized thermoplastic layer which constitutes the upper side of the package. A further object of the present invention is to create a space between the lower threads of the pouring spout and the upper side of the package.

These and other objects have been attained according to the present invention in that the device of the type described by way of introduction has been given the characterizing feature that one end of the advancement tube is provided with an external spacer ring.

A preferred embodiment of the invention includes a forming tool for engaging a first side of a thermoplastic sheet, and a tube for advancing a closure member to a second side of the thermoplastic sheet. An external spacer ring is provided on an outside surface of an end of the advancing tube which creates a space between the lower threads of the pouring spout and the upper side of the package.

BRIEF DESCRIPTION OF THE ACCOMPANYING DRAWINGS

One preferred embodiment of the present invention will now be described in greater detail hereinbelow, with particular reference to the accompanying Drawings. In the accompanying Drawings:

FIG. 1 is a side view, partly in section, of the device for thermoforming according to a preferred embodiment of the present invention; and FIG. 2 is an isometric view of the spacer ring.

DESCRIPTION OF THE PREFERRED EMBODIMENT

Figure 1:
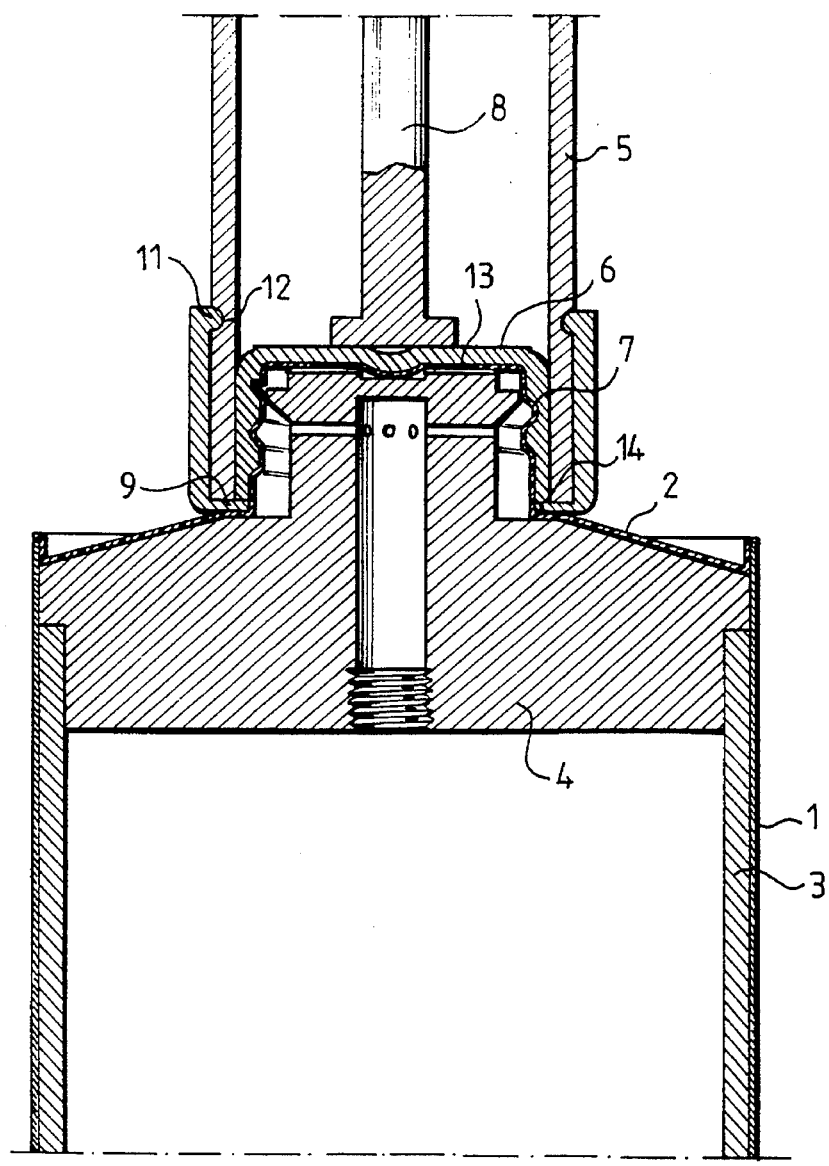

The opening arrangement in connection with which the device according to the present invention is employed may be applied to different package types. One such package type consists of side walls 1 of a laminate with a core of paper or paperboard to which is laminated an outer layer of thermoplastic, the package type being further provided with an upper panel or wall 2 wholly consisting of thermoplastic. Other package types are conventional gable-top packages or parallelepipedic packages in whose upper wall a field has been cut out which is covered from the underside by a thermoplastic layer.

Regardless of package type, the opening arrangement is produced in a similar way. The as yet unfinished package (which is still open at the bottom) is mounted on a mandrel 3 and a forming tool 4 is inserted via the bottom of the package. At the same time, an advancement tube 5 is moved towards the upper side 2 of the package, this tube being intended to advance to the opening arrangement an outer closure portion 6. The outer closure portion 6 is employed as a mold for thermoforming a pouring spout 7 which is formed from the thermoplastic material layer constituting the upper panel or wall 2 of the package.

FIG. 1 shows, partly in section, the upper region of a packaging container of that type which consists of side walls 1 of a packaging laminate to which is sealed an upper panel or wall 2 of thermoplastic. The packaging container (which is open at its lower end) is mounted on a so-called mandrel 3 and a forming tool 4 is inserted inside the package for forming the pouring spout 7 of the opening arrangement. An advancement tube 5 abuts against the upper side 2 of the package, a pusher 8 being disposed within the tube. The advancement tube 5 is intended to advance, to the upper side 2 of the package, an outer closure portion 6 wherein the pouring spout 7 is formed. The pusher 8 fixedly retains the outer closure portion 6 against the upper side 2 of the package during the thermoforming process.

A spacer ring 9 is disposed on the lower region of the advancement tube 5. In the preferred embodiment, the spacer ring 9 is produced as a part of a tubular portion 10 lying outside the advancement tube 5. The upper end of the tubular portion 10 is provided with a bead 11 which rigidly engages with a corresponding groove 12 in the advancement tube 5. The innermost diameter of the spacer ring 9 is slightly less than the smallest diameter of the advancement tube 5 and that edge which, in such instance, projects in towards the center of the advancement tube 5 fixedly retains the outer closure portion 6 during the thermoforming process.

Figure 2:
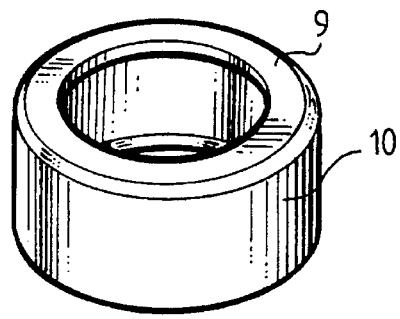

The preferred embodiment of the spacer ring 9 with its tubular portion 10 is shown in FIG. 2 in its entirety. Of course, the spacer ring 9 may also be produced by other means, without the outer tubular portion 10 lying outside the advancement tube 5. Thus, a spacer ring 9 may, for example, only comprise a circular portion fixedly secured to the lowermost end of the advancement tube 5.

As shown in FIG. 1, the upper thermoplastic wall 2 of the packaging container has been formed into a pouring spout 7 in that the forming tool utilizes the outer closure portion 6 as a mold. After completion of the thermoforming of the pouring spout 7, the outer closure portion 6 is moved by means of the pusher 8 out from the advancement tube 5 in order to remain in place on the pouring spout 7 formed in the closure portion 6. In such instance, the spacer ring 9 must give way so that the outer closure portion 6 may pass through the diameter which is tighter in relation to the advancement tube 5. In such instance, the spacer ring 9 is ideally produced from a resiliently yieldable material such as, for example, rubber. Rubber also possesses the quality that, during the thermoforming process, it seals against that neck 14 which is formed between the upper side 2 of the package and the outer closure portion 6.

Once the outer closure portion 6 has been moved out of the advancement tube 5, the forming tool 4 is withdrawn and the outer closure portion 6 is sealed against the upper wall 13 of the pouring spout by ultrasonic sealing. This seal is intended to be broken on opening of the package. Thereafter, the thus almost finished package is stripped from the mandrel 3, filled and bottom sealed to form a finished packaging container.

On opening of an opening arrangement which has been manufactured using a device according to the present invention, the upper wall 13 of the pouring spout 7 which is sealed to the inner portion of the outer closure portion 6 is broken. On reclosure of the opening arrangement, the neck 14 which had been formed by employment of the spacer ring 9 allows the outer closure portion 6 to be screwed in more tightly and thereby create a more reliable and tighter reclosure.

As will have been apparent from the above description, the present invention realises a device which permits improved production of the opening arrangement so that the outer closure portion does not run the risk of fastening against the upper wall of the packaging container. By the employment of the device on thermoforming of the opening arrangement, a neck will also be formed which, on reclosure of the package, permits a more reliable and tighter reclosure of the package in that the outer closure portion can be screwed in place more tightly.

The present invention should not be considered as restricted to that described above and shown in the Drawings, many modifications being conceivable without departing from the spirit and scope of the invention.

What is claimed is:

1. A device for thermoforming a pouring spout from a thermoplastic sheet comprising:

a forming tool for forming the pouring spout, said forming tool having a molding surface for engaging a first side of the thermoplastic sheet to form an inside surface of the pouring spout;

a tube for advancing a closure member to a second side of the thermoplastic sheet, said closure member having an inner surface which defines a molding surface for engaging the second side of the thermoplastic sheet opposite said forming tool; and an external spacer ring provided on an outside surface of an end of said tube.

2. The device for thermoforming of claim 1, wherein the spacer ring is made of resiliently yieldable material.

3. The device for thermoforming of claim 2, wherein the spacer ring is made of rubber.

4. The device for thermoforming of claim 1, wherein the spacer ring further comprises a cylindrical portion positioned outside said tube for advancing the closure member.

5. The device for thermoforming of claim 4, wherein the tube for advancing the closure member is provided with a groove extending circumferentially about the tube and said cylindrical portion is provided with a bead which corresponds to and engages the groove.

6. The device for thermoforming of claim 1, wherein the spacer ring is positioned on a lower end of said tube between the tube and the second side of the thermoplastic sheet.

7. A device for forming a pouring spout in a thermoplastic sheet, comprising:

tubular support means for supporting a closure cap having an inner molding surface;

a forming tool arranged in axial alignment with the tubular support means, the forming tool having a molding surface for forming an inside surface of the pouring spout, said molding surface including a radial shoulder and the tubular support means having an end positioned in opposition to the radial shoulder; and a spacer ring on the tubular support means and extending over the end of the tubular support means.

8. The device according to claim 7, wherein the spacer ring is made of resiliently yieldable material.

9. The device according to claim 7, wherein the tubular support means includes a tube and a pusher in the interior of the tube for supporting the closure cap in alignment with the end of the tube.

10. The device according to claim 8, wherein the spacer ring is positioned over the exterior surface of the tube and has a ring portion that extends over the end of the tube and is positioned to engage the closure cap in the interior of the tube.

11. A device for thermoforming a pouring spout from a thermoplastic sheet comprising:

a forming tool having a molding surface for engaging a first side of the thermoplastic sheet;

a tube for surrounding a closure member, said closure member having an inner surface which defines a molding surface for engaging a second side of the thermoplastic sheet; and an external spacer ring provided on an outside surface of an end of said tube, said spacer ring including a cylindrical portion positioned outside said tube for advancing the closure member.

12. The device for thermoforming of claim 11, wherein the tube for advancing the closure member is provided with a groove extending circumferentially about the tube and said cylindrical portion is provided with a bead which corresponds to and engages the groove.

* * * * *